(No Model.)
J. W. GRANTLAND.
PHOTOGRAPHIC SHUTTER.
No. 496,356. Patented Apr. 25, 1893.
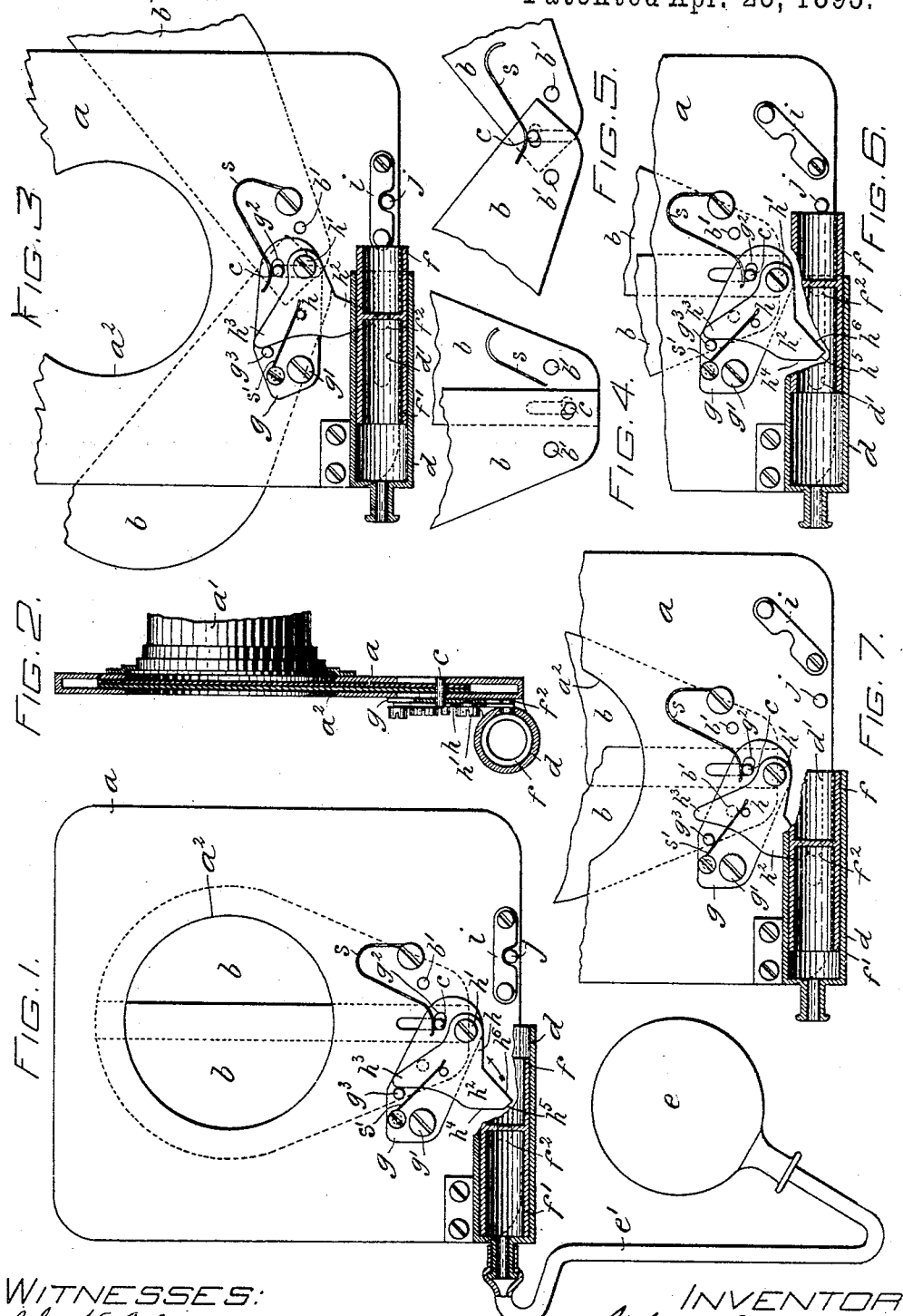

UNITED STATES PATENT OFFICE.

JOHN W. GRANTLAND, OF PHILADELPHIA, PENNSYLVANIA, ASSIGNOR TO THE E. & H. T. ANTHONY & COMPANY, OF NEW YORK, N. Y.

PHOTOGRAPHIC SHUTTER.

SPECIFICATION forming part of Letters Patent No. 496,356, dated April 25, 1893.

Application filed January 21, 1893. Serial No. 459,047. (No model.)

*To all whom it may concern:*

Be it known that I, JOHN W. GRANTLAND, a citizen of the United States, residing at the city of Philadelphia, in the county of Philadelphia and State of Pennsylvania, have invented certain new and useful Improvements in Photographic Shutters, of which the following is a specification.

My invention relates in general to photographic shutters having wings operated through the instrumentality of a compressible hand bulb; and it relates more particularly to the construction, arrangement and mode of operation of the devices and parts that control the opening and closing of the wings.

The principal objects of my present invention are first, to provide a neat, durable, reliable and comparatively inexpensive photographic shutter for effecting either time or instantaneous exposures; second, to provide simple and efficient apparatus or mechanism for positively opening and closing the normally closed wings of the photographic shutter to effect a time exposure; and third, to arrange the component parts of this apparatus or mechanism for operation in such manner that the same are adapted to effect an instantaneous exposure and are then positively and automatically returned to normal position for effecting another opening of the wings after the completion of each instantaneous exposure.

My invention consists of a photographic shutter comprising a piston working in a pneumatic cylinder and provided with a projection, a pivotal wing lever adapted to actuate a pin for opening a series of wings against the force of a spring, and a spring-controlled trigger-lever pivoted to said wing-lever and disposed in range of the projection on the piston and in range of a lug on the wing lever.

My invention further consists of a photographic shutter, comprising a pivotal wing lever adapted to actuate a pin for opening a series of wings, against the force of a spring, a spring controlled trigger-lever pivoted to said wing-lever and tending to engage a lug on the wing-lever, a piston working in a pneumatic cylinder and provided with a projection in range of the trigger-lever, and a stop for limiting the range of travel of the piston to prevent the disengagement of the projection and trigger-lever and to permit a time exposure to be effected.

My invention further consists of the improvements in photographic shutters hereinafter fully described and particularly pointed out in the claims.

The nature, characteristic features and scope of my invention will be more fully understood from the following description taken in connection with the accompanying drawings forming part hereof; and in which—

Figure 1, is a front elevational view partly in section of a photographic shutter embodying features of my invention, showing the wings thereof in closed position and also showing the trigger-lever in position for actuating the wing lever during the forward stroke of the piston and the stop in position for checking such motion of the piston in order to effect a time exposure. Fig. 2, is a transverse sectional view of Fig. 1, illustrating a convenient mode of applying my improved photographic shutter to a camera and also showing a projection on the piston. Fig. 3, is a view similar to Fig. 1, showing the normally closed wings retained in open position by reason of the fact that the forward stroke of the piston is checked by the stop, thus causing the trigger-lever to engage a lug on the wing-lever and also a projection on the piston. Fig. 4, is a detached view showing parts of the pivotal wings, a pin for opening and closing them, and a part of a spring for maintaining them normally in closed position. Fig. 5, is a view similar to Fig. 4, showing wings in open position. Fig. 6, is a view partly in section showing the position of the parts after an instantaneous exposure has been effected at the intermediate portion of the forward stroke of the piston; and Fig. 7, is a view partly in section illustrating the position of the parts during the return stroke of the piston and showing the trigger-lever shifted independently of the wing-lever.

In the drawings $a$, is a main frame or hollow housing adapted to be applied to the end of a camera tube $a'$, in such manner that it ranges transversely thereof, as shown in Fig. 2. This housing $a$, is provided with a central aperture $a^2$, corresponding in size and position with the bore of the camera-tube $a'$.

$b$, are wings located within the housing $a$, and pivotally connected therewith by means of pins $b'$, ranging transversely of the interior of the housing and engaging suitable openings or pivot holes in the respective wings.

$c$, is a pin ranging transversely of the housing and projecting beyond the face of the same. The pin $c$, works up and down in straight slits formed in the face and rear walls of the housing and engages curved slots in the respective wings. The movement of the pin $c$, in an upward direction through the straight slits of the housing and the curved slots of the wings causes the latter to be turned about their respective pivotal supports $b'$, into position for opening the aperture $a^2$. The movement of the pin $c$, in a downward direction through the straight slits of the housing and curved slots of the wings $b$, causes the latter to be turned about their respective points of pivotal support into position for closing the aperture $a^2$.

$d$, is a pneumatic cylinder which supplies power for shifting the pin $c$, in an upward direction in order to effect the opening of the aperture $a^2$. The closing of this aperture is effected by a spring $s$, which is secured to the housing $a$, and tends to push the pin $c$, normally downward.

$e$, is a compressible bulb communicating with the interior of the cylinder $d$, by means of the tube $e'$, and adapted when compressed by the hand of the operator to supply compressed air to the cylinder.

Having thus briefly indicated certain of the parts of one of the many well known types of photographic shutters to which my invention is applicable, I will now proceed to describe the construction and mode of operation of the mechanism which embodies my present invention and which is interposed between the piston of the cylinder $d$, and the pin $c$, for effecting and controlling the opening of the wings $b$, against the force of the spring $s$.

$f$, is a piston adapted to work in the cylinder $d$, and said piston being elongated as at $f'$, in order to cover a slot $d'$, cut or otherwise formed in the curved wall of the cylinder, so as to prevent the escape of air.

$f^2$, is a projection formed upon the piston $f$, and extending through the slot $d'$, in the cylinder $d$, for a purpose to be presently described.

$g$, is a wing-lever pivotally attached to the front plate of the housing $a$, as at $g'$, and provided with a slot $g^2$, engaging the pin $c$, so that when the lever $g$, is turned upward or downward around its point $g'$, the pin $c$, is shifted upward or downward and thus effects the opening or closing of the wings $b$.

$h$, is a trigger-lever pivotally attached to the wing lever $g$, as $h'$, and provided with two arms $h^2$ and $h^3$. The arm $h^2$, is provided with a straight part $h^4$, adapted to contact with the projection $f^2$ of the piston $f$, during the first portion of the forward stroke of the piston, with a beveled extremity $h^5$, adapted to permit the projection $f^2$, to pass beyond the trigger-lever in effecting an instantaneous exposure, and with an inclined portion $h^6$, adapted to permit the projection to shift the trigger-lever when the parts are being returned to normal position, after an instantaneous exposure has been effected. The arm $h^3$, is adapted to contact with a lug, pin or stud $g^3$, projecting from the face of the wing-lever $g$, and is maintained normally in contact therewith by means of a spring $s'$.

$i$, is a stop pivotally connected with the front of the housing $a$, and adapted to be shifted into the path of movement of the piston $f$, in order to prevent its completing its full stroke.

$j$, is a back stop attached to the front of the housing and disposed in range of the piston $f$, in order to prevent its escaping from the open extremity of the cylinder $d$, when the pivotal stop $i$, has been turned out of its path.

The mode of operation of the above described device in effecting a time exposure, that is, in opening the aperture $a^2$, maintaining the same in open position for any required length of time, and then closing the aperture is as follows:—The stop $i$, is shifted into position for limiting the stroke of the piston $f$, as shown in Figs. 1 and 3, and the piston $f$, is impelled forward into contact with the stop $i$, by compressing the hand-bulb $e$. This forward motion of the piston causes the projection $f^2$, to engage the straight part $h^4$, of the trigger-lever $h$, and to rock the latter in the direction indicated by the arrow in Fig. 1. Under these circumstances the arm $h^3$, of the trigger-lever engages the projection $g^3$, on the wing-lever $g$, so that the latter is shifted in a similar direction against the force of the spring $s$, with the result that the pin $c$, is shifted upward and thus effects the opening of the wings $b$, as shown in Fig. 3. The wings $b$, are retained in such position until the hand bulb $e$, is released, whereupon the piston is drawn backward into its cylinder and the wings are closed under the influence of the spring $s$.

An instantaneous exposure may be effected by shifting the stop $i$, out of range of the piston as in Figs. 6 and 7, and then causing the piston to complete its full forward and return stroke by means of the hand bulb. During the first portion of the forward stroke of the piston the projection $f^2$, engages the straight part $h^4$, of the arm $h^2$, and thus causes the trigger-lever $h$, to engage the projection $g^3$, and thus rock the wing lever $g$, and shift the pin $c$, into position for opening the wings $b$. However, before the completion of the forward stroke of the piston $f$, the projection $f^2$, slips under and to the right of the part $h^5$, of the trigger-lever thus disengaging the same, and permitting the spring $s$, to shift the pin $c$, downward and close the wings $b$, as shown in Fig. 6. During the return stroke of the piston the projection $f^2$, engages the inclined part $h^6$, of the trigger-lever, thus pushing the trigger lever aside as shown in Fig. 7, without in anywise affecting the position of the wing-lever $g$, or wings $b$, so that the projection $f^2$, is returned by a positive motion into position for effecting a second exposure.

Having thus described the nature and objects of my invention, what I claim as new, and desire to secure by Letters Patent, is—

1. A photographic shutter, comprising a piston working in a pneumatic cylinder and provided with a projection, a pivotal wing-lever adapted to actuate a pin for opening a series of wings against the force of a spring, and a spring controlled trigger-lever pivoted to said wing-lever and disposed in range of the projection on the piston and in range of a lug on the wing-lever, the construction and arrangement being such that the projection on the piston rocks the trigger-lever and wing-levers and effects an instantaneous exposure during the intermediate portion of the forward stroke of the piston and rocks the trigger-lever independently of the wing-lever during the intermediate portion of the return stroke of the piston.

2. A photographic shutter, comprising a pivotal wing-lever adapted to actuate a pin for opening a series of wings against the force of a spring, a spring controlled trigger-lever pivoted to said wing-lever and tending to engage a lug on the wing-lever, a piston working in a pneumatic cylinder and provided with a projection in range of the trigger-lever, and a stop for limiting the range of travel of the piston to prevent disengagement of the projection and trigger-lever and to permit of the accomplishment of a time exposure.

3. In a photographic shutter, a pivotally supported wing-lever engaging a pin for opening a series of wings against the force of a spring, a trigger-lever pivoted to said wing-lever and provided with two arms, whereof one is in range of a projection on the piston, a lug interposed between the other arm of the trigger-lever and the wing-lever and adapted to permit of the rocking of both levers by the shifting of the trigger-lever in one direction, and a spring interposed between said levers and adapted to permit of the rocking in a reverse direction of the trigger-lever independently of the wing-lever, substantially as and for the purposes set forth.

4. In a photographic shutter, a pivotally supported wing-lever engaging a pin for opening a series of wings against the force of a spring, a trigger-lever pivoted to said wing lever, and a lug and spring interposed between said levers and adapted to permit of the shifting of the trigger-lever in one direction to rock the wing-lever and to permit of the shifting of the trigger-lever in a reverse direction independently of the wing lever, substantially as and for the purposes. set forth.

5. In a photographic shutter, a pivotally supported wing lever engaging a pin for opening a series of wings against the force of a spring, a trigger-lever pivoted to said wing-lever and provided with two arms, whereof one is in range of a projection on the piston and is provided with parts as $h^4$, $h^5$ and $h^6$ and a lug and spring interposed between the other arm of the trigger-lever and the wing-lever, substantially as and for the purposes set forth.

In witness whereof I have hereunto set my signature in the presence of two subscribing witnesses.

JOHN W. GRANTLAND.

Witnesses:
CHAS. F. HUNT,
WM. B. CRAIG.